No. 639,620. Patented Dec. 19, 1899.
R. P. SCHILLING.
RAM FOR METALLIC PACKING.
(Application filed June 5, 1899.)
(No Model.)
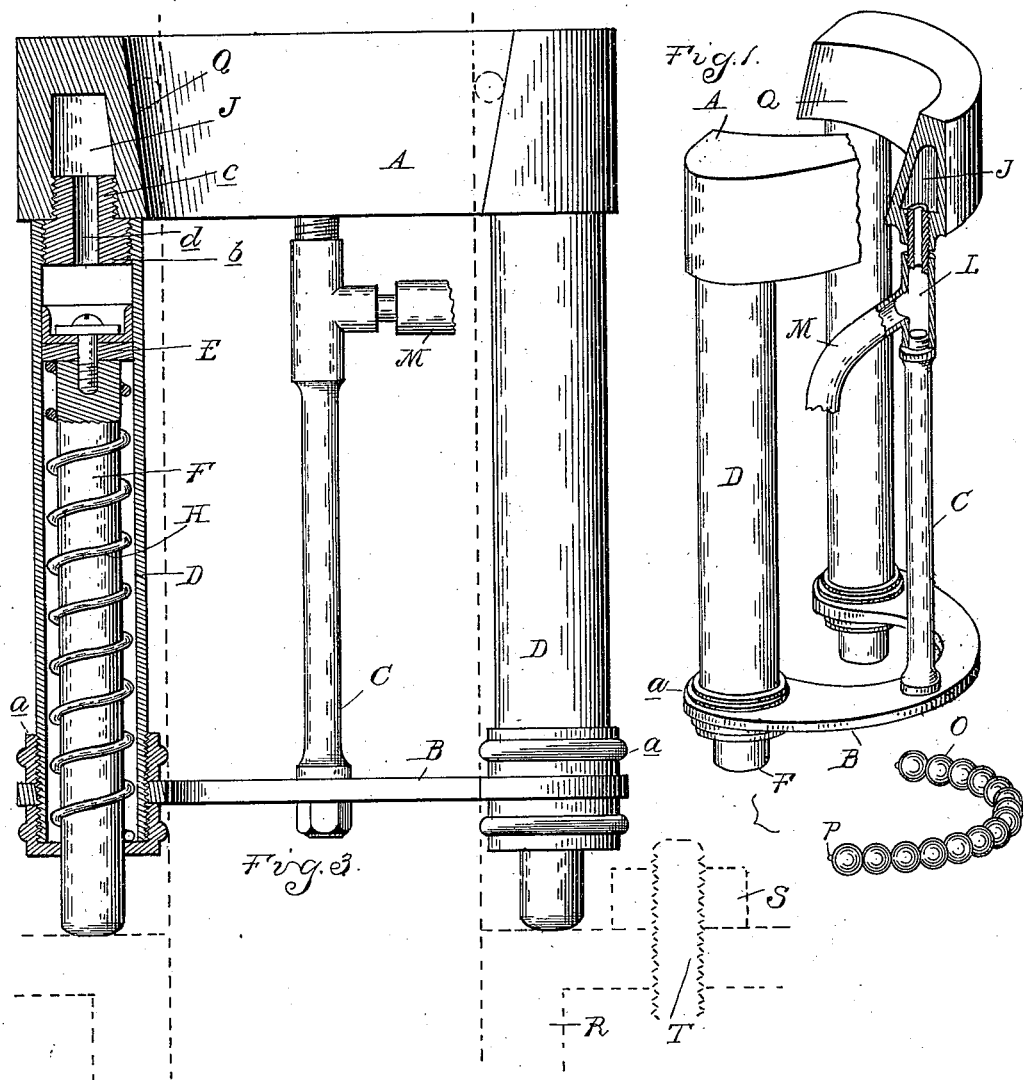
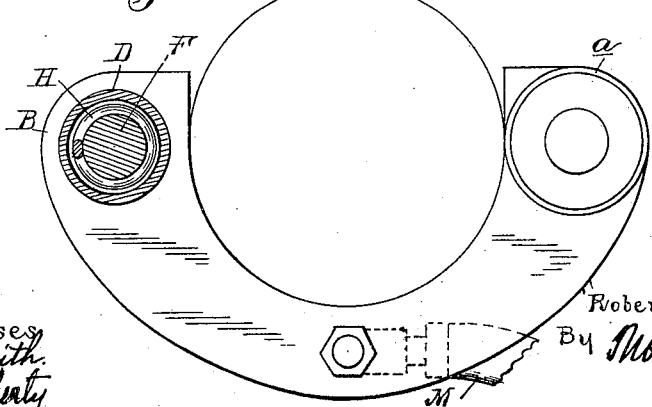
Witnesses
H. C. Smith
M. B. Dougherty
Inventor
Robert P. Schilling
By Thos. H. Sprague & Son
Attys.

UNITED STATES PATENT OFFICE.

ROBERT P. SCHILLING, OF BERKLEY, VIRGINIA, ASSIGNOR OF ONE-HALF TO T. HERBERT ROBERTS, OF NORFOLK, VIRGINIA.

RAM FOR METALLIC PACKING.

SPECIFICATION forming part of Letters Patent No. 639,620, dated December 19, 1899.

Application filed June 5, 1899. Serial No. 719,489. (No model.)

*To all whom it may concern:*

Be it known that I, ROBERT P. SCHILLING, a citizen of the United States, residing at Berkley, in the county of Norfolk and State of Virginia, have invented certain new and useful Improvements in Rams for Metallic Packing, of which the following is a specification, reference being had therein to the accompanying drawings.

The invention consists in the construction of a ram for use upon shafts, and particularly designed to be used for compressing the springs in metallic packing upon locomotive piston-rods.

The invention further consists in the construction, arrangement, and combination of the parts, as more fully hereinafter described, and particularly pointed out in the claims.

In the drawings, Figure 1 is a perspective view of my improved device. Fig. 2 is a bottom plan view showing one of the cylinders in section; and Fig. 3 is a front elevation, partly in section, to show the construction of the clamp or clutch for holding the device upon the shaft.

In this particular illustration of my invention I have shown a pneumatic ram; but I believe it is within the spirit of my invention to employ any power-actuated movable member in place thereof.

The ram comprises the heads A and B, preferably curved and of a size to embrace the shaft to which they are to be attached. These two heads are connected together in any suitable manner. In this construction I have shown them connected by the connecting-bar C at the middle and by the cylinders D at each side. I preferably connect the cylinders to the heads in the manner shown in the drawings, the connection to the head B being by means of the lock-nuts *a* and the connection to the head A being by means of an apertured plug *b*, screwed into the end of the cylinder and having a reduced nipple *c* engaging a screw-threaded aperture in the head. In each cylinder is the piston E and a plunger or piston rod F, passing through the outer end of the cylinder, as plainly shown in Fig. 2. Opposing the outward movement of the plunger is a spring H.

The head A has the chamber J therein, which by suitable ports *d* connects with the cylinder, as shown in Fig. 3. The connecting-rod C, I preferably form with a hollow portion L at one end leading into and connected with the chamber J in the head A, and this hollow portion I connect by a pipe M with any suitable source of air under pressure.

The device may be clamped upon the piston-rod in any suitable manner. The means I preferably employ is as follows: I take a series of balls or rollers O and string them upon the connecting-rod P in the form of a semicircle, the length of the rod being slightly greater than one-half the circumference of the shaft on which they are to be applied. Placing this string of balls upon the shaft and placing the frame of the machine upon the shaft, I either slide the ring of balls into the recess in the head A formed by the inclined face Q or shove the head upon the balls, so that they contact the inclined face. Any tendency to further endwise movement of the frame will be checked by the clamping effect of the inclined face upon these balls and the balls in turn upon the shaft forming a quick-acting and simple clutch to hold the frame upon the shaft and to prevent endwise movement thereof. Now if air is admitted through the pipe M into the hollow head A it will act upon the piston E and force out the plungers.

My device is intended particularly to be employed as shown in Fig. 3—that is, to compress the springs which back the glands R of the packing on a locomotive or other engine piston-rod. Therefore if my device is applied to such locomotive piston-rod, as shown in Fig. 3, in proximity to the gland R and the air is admitted into the end of the cylinders the plungers will impinge against the glands and move them upon the shaft, slightly compressing the springs which back these glands and loosen the pressure upon the nuts S of their clamping-bolts T. As soon as these nuts are removed the air-pressure may be gradually released from the plungers and they will slowly retract into the cylinders and allow the spring of the packing to expand.

In applying the gland, as well as in removing it, it is evident that my device may be used, although it is especially desirable for use in removing the glands to renew the packing. Heretofore it has been difficult and actually dangerous to remove the clamping-nuts of these glands because of the great pressure of the springs back of the same, and it frequently happens that the springs and pieces of the spring-packing are thrown all about the shop when the nuts are loosened. My device overcomes these objections and greatly simplifies and saves time in removing and applying these glands in such packing.

While I have shown and described a pneumatic motor for moving the plungers, I do not deem that essential to my invention, but believe I am the first to employ a frame adapted to be detachably coupled to a shaft and supporting a plunger which may be moved to perform such duties as those herein specified.

What I claim as my invention is—

1. The combination of a frame, a clamp for detachably holding the frame from endwise movement upon a shaft, said clamp being constructed to be applied to and to engage over the shaft at a point intermediate the shaft ends, a plunger supported by said frame, and means for moving said plunger parallel with said shaft for holding it in its outer position and for gradually releasing it.

2. A ram for metallic packing comprising a frame, a clutch for detachably holding the frame from endwise movement upon a shaft, said clutch being constructed to be applied to and to engage with the shaft at a point intermediate the shaft ends, and a plunger in said frame adapted to be moved opposite to the direction of the locking movement of the clutch.

3. The combination of the two heads, cylinders D connecting the heads, the pistons and plungers therein, air-supply connection to one end of the cylinders and a clutch for connecting the frame upon the shaft.

4. The combination of a frame adapted to be mounted upon a shaft intermediate its ends, a head at one end of the frame curved to span more than half of the shaft upon which it is to be applied, said head having its under or meeting face cut away from the rear of the head to the front thereof, to form the upwardly-inclined face Q, and a clutch member conforming in configuration to the head adapted to be detachably arranged over the shaft beneath the inclined face of the head, for the purpose described.

5. The combination of a frame adapted to be mounted upon a shaft intermediate its ends, a head at one end of the frame curved to span more than half of the shaft upon which it is to be applied, said head having its under or meeting face cut away from the rear of the head to the front thereof, to form the upwardly-inclined face Q, and a series of connecting rollers or balls O, adapted to be detachably arranged over the shaft beneath the inclined face of the head, for the purpose described.

In testimony whereof I affix my signature in presence of two witnesses.

ROBERT P. SCHILLING.

Witnesses:
L. A. HALEY,
J. N. DUFFY.